United States Patent [19]
Farr et al.

[11] Patent Number: 4,606,585
[45] Date of Patent: Aug. 19, 1986

[54] ANTI-SKID HYDRAULIC BRAKING SYSTEMS FOR VEHICLES

[75] Inventors: Glyn P. R. Farr, Warwickshire; Ivan Mortimer, West Midlands; Anthony W. Harrison, Birmingham, all of England

[73] Assignee: Lucas Industries Public Limited Company, Birmingham, England

[21] Appl. No.: 689,179

[22] Filed: Jan. 7, 1985

[30] Foreign Application Priority Data

Jan. 14, 1984 [GB] United Kingdom ............... 8400991

[51] Int. Cl.⁴ .................................................. B60T 8/02
[52] U.S. Cl. ..................................... 303/92; 303/115; 303/116
[58] Field of Search ................ 303/92, 115, 117, 119, 303/116, 68–69, 61–63, 114, 84; 188/181 A, 181 C

[56] References Cited

U.S. PATENT DOCUMENTS 3,747,990 7/1973 Tanguy ............................ 303/92
3,813,130 5/1974 Inada .............................. 303/115
4,457,563 7/1984 Farr ................................ 303/92

FOREIGN PATENT DOCUMENTS 2120337 11/1983 United Kingdom ............... 303/115

Primary Examiner—Douglas C. Butler
Attorney, Agent, or Firm—Laff, Whitesel, Conte & Saret

[57] ABSTRACT

An anti-skid hydraulic braking system incorporates a modulator assembly for modulating the supply of fluid from a master cylinder to a brake in accordance with skid signals. The modulator assembly comprises a de-boost piston located in a bore in a housing, an expander chamber connected to the brake, a first valve between the master cylinder and the chamber, and a second valve for controlling the application of the de-boost piston of a fluid sustained-support force. The modulator assembly incorporates a safety piston which prevents the first valve from closing unless a device, suitably an hydraulic accumulator or pump, and which provides the fluid sustained-support force, is operative.

4 Claims, 7 Drawing Figures

ANTI-SKID HYDRAULIC BRAKING SYSTEMS FOR VEHICLES

This invention relates to anti-skid hydraulic braking systems for vehicles of the kind in which hydraulic fluid from a source of hydraulic fluid under pressure is supplied to a wheel brake of a vehicle through a modulator assembly which is adapted to modulate the supply of fluid from the source to the brake in response to skid signals from skid sensing means, the modulator assembly comprising a de-boost piston assembly located in a bore in a housing, an expander chamber connected to the brake, a first valve disposed between the source and the expander chamber, and a second valve for controlling the application to the de-boost piston assembly of a fluid-sustained support force to determine the relative position of the de-boost piston assembly in the bore, the second valve normally being so operative that the support force holds the de-boost piston assembly in an advanced position in which the effective volume of the expander chamber is at a minimum value, the first valve normally being open to provide communication between the source and the brake at least when the de-boost piston assembly is in the said advanced position, and means responsive to a skid signal to manipulate the second valve in order to reduce the support force whereafter the de-boost piston assembly can move away from the advanced position and into a retracted position in which the effective volume of the expander chamber is increased thereby reducing the pressure applied to the brake, the reduction in the support force also permitting the first valve to close.

In known anti-skid hydraulic braking systems of the kind set forth the fluid-sustained support force is provided by pressure from an hydraulic accumulator adapted to be charged by a pump. Upon failure of the accumulator and/or the pump the support force is destroyed, and the de-boost piston assembly can move into the retracted position, in the absence of any safety device, causing the first valve to close which isolates the source from the brake to prevent the brake from being applied.

In GB-A-2 120 337 this possibility is overcome by the provision of a safety device in the form of a large spring which urges the piston assembly into the advanced position upon failure of the support force. The provision of such a spring, although mechanically effective, increases substantially the bulk of the modulator assembly, in turn creating installation difficulties in restricted spaced with the inherent increase in the weight of the assembly.

According to the present invention in an anti-skid hydraulic braking system of the kind set forth the first valve comprises a seating member, and a valve member movable with respect to the seating member in response to movement of the de-boost piston assembly in the bore between the advanced and retracted positions, and safety means responsive to the pressure which provides the fluid-sustained support force is adapted to co-operate with one of said members to prevent the seating member and the valve member from engaging each other to permit the valve to close unless the said pressure is operative.

This provides a compact assembly which facilitates installation in limited spaces.

The safety means may comprise a safety piston which is coupled to the valve member through a lost-motion connection and is subjected at opposite ends to the said pressure and the pressure of the source, the safety means normally being subjected to a net force which holds it in an advanced position in which the valve is permitted to close, but being movable by the pressure of the source upon failure of the said pressure into a retracted position to take up the lost-motion and hold the valve member away from the valve seating.

Alternatively the seating member may itself be movable in the housing, normally being biassed in one direction by the said pressure and into an advanced position in which the valve member can engage with the seating member, failure of the said pressure permitting the seating member to move relatively away from the valve member and into a retracted position in which the valve member is unable to engage with the seating member.

Several embodiments of our invention are illustrated in the accomanying drawings in which.

Figure 1:
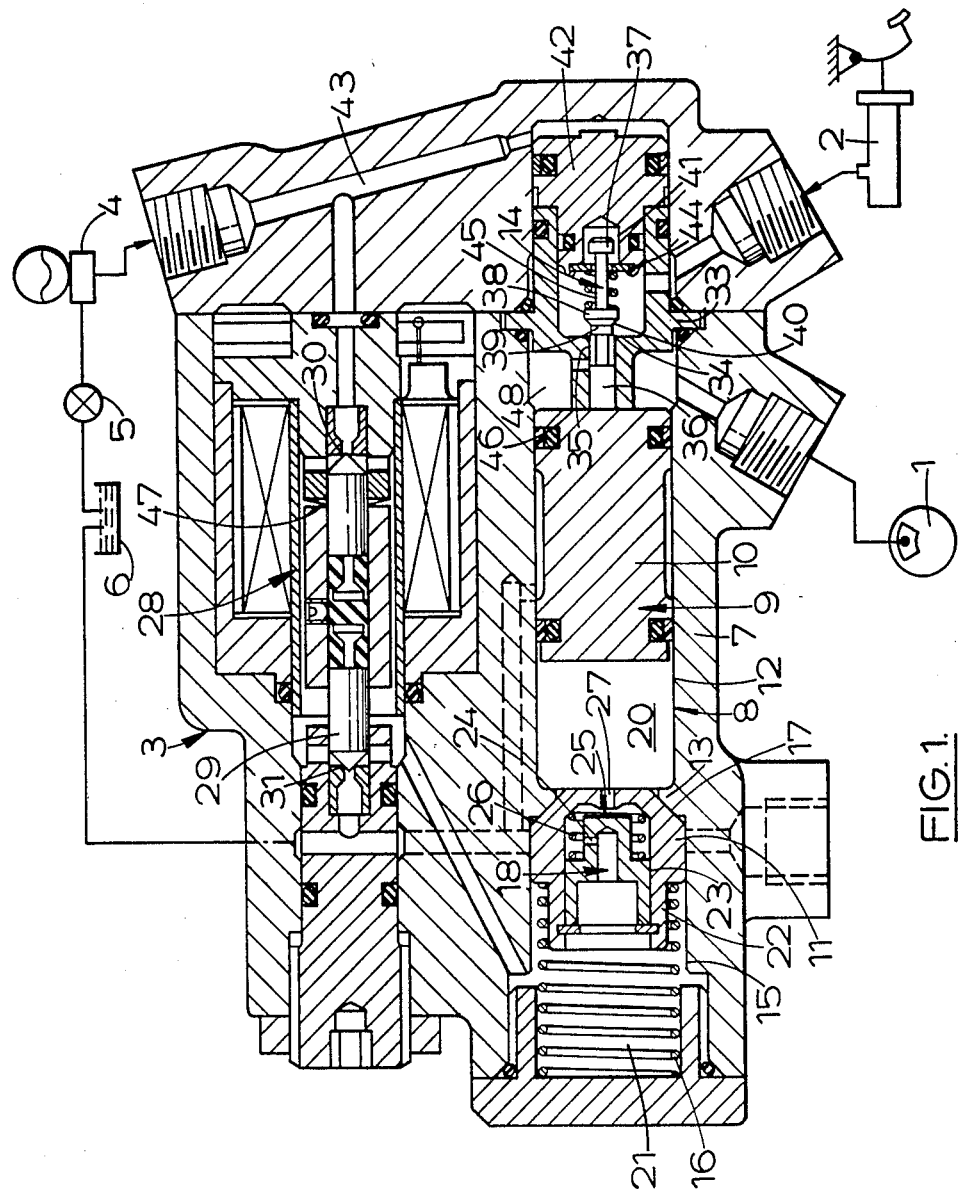
FIG. 1 is a layout of an hydraulic anti-skid braking system including a longitudinal section through a modulator assembly.

In the braking system shown in the layout of FIG. 1 a brake 1 is adapted to be applied by a master cylinder 2, and the supply from the master cylinder 2 to the brake is modulated by a modulator assembly 3. A fluid-sustained support force for the modulator assembly 3 is provided by an hydraulic accumulator 4 which is charged by a pump 5 which, in turn, draws hyraulic fluid from a reservoir 6.

The modulator assembly 3 comprises a housing 7 provided with a stepped bore 8 in which works a de-boost piston assembly 9 comprising a first piston 10 and a second piston 11. The first piston 10 works in portion 12 of the bore 8 which is of smaller diameter and which is disposed between a radial shoulder 13 and a first valve 14 for controlling communication between the master cylinder 2 and the brake 1. The second piston 11 works in a portion 15 of the bore 8 which is of greater diameter and a conical face at its inner end is normally urged by a spring 16 against an inclined abutment face 17 on the shoulder 13.

A flow-control regulating valve 18 is incorporated in the second piston 11 to regulate the flow of fluid in both directions between a control chamber 20 defined in the bore 8 between adjacent ends of the two pistons 10 and 11 and a fluid-sustaining chamber 21 on the opposite side of the piston 11. The valve 18 comprises a spool 22 working in a bore 23 in the piston 11 and provided with an orifice 24 to provide communication through the spool 22, and a plain face 25 at the inner end of the spool is normally urged by a spring 26 away from an orifice 27 passing through the inner end of the piston 11.

A solenoid-operated valve 28 (second valve) responsive to signals from a wheel speed sensor 28a controls operation of a valve member 29 which is alternatively engageable with paced valve seatings 30, 31, and the valve member 29 is readily movable since it is at all times totally immersed in hydraulic fluid. The valve 28 is operative to control the supply of fluid from the accumulator 4 to the chamber 21, and between the chamber 21 and the reservoir 6.

The first valve 14 comprises a seating member 33 which is rigidly clamped in the housing 7 and has a seating 34 surrounding a central axial passage 35. A valve stem 36 guided to slide on the passage 35 has an extension of reduced diameter at the free end of which is provided an enlarged head 37 and at an intermediate point in the length of which is provided a valve head 38. The valve head 38 has a land 39 which is of a diameter smaller than that of the passage 35 in which it is adapted to be received, and an inclined radial face 40 for engagement with the seating 34. The head 37 is received in a recess 41 in the inner end of a piston 42 which is movable in the bore 8 but which is normally urged inwardly into abutment with the seating member 33 by pressure from the accumulator 4 which is applied to it through a passage 43. In this position the head 37 is spaced from an abutment plate 44 carried by the piston 42 and through which the stem 36 projects. The plate acts as an abutment for a spring 45 acting to urge the valve head 38 towards the seating 34.

In the inoperative position shown in the drawing no skid signal is present and the valve member 29 is biassed by a Belleville or other spring or spring washer 47 into engagement with the seating 31 to isolate the chamber 21 from the reservoir 6. Hydraulic fluid from the accumulator is supplied to the chamber 21 and a volume of fluid in the control chamber 20 holds the first piston 10 held in a advanced position in engagement with an abutment 46 defined by the adjacent end of the seating member 33, since the chamber 21 and the control chamber 20 are connected by means of the piston 11. The spring 16 holds the piston 11 against the abutment 13. In this position the piston 10 holds the valve head 38 away from the seating 34 with the land 39 clear of the passage 35, so that the master cylinder 2 is in open communication through the first valve 14 to apply the brake 1.

When a skid signal is produced by the skid sensor, the solenoid valve 28 is operated by energisation of its solenoid against the load in the spring 47 to cause the valve member 29 to move away from the seating 31 and into engagement with its seating 30. This cuts off communication between the accumulator 4 and the chamber 21, and dumps the fluid in the chamber 21 to the reservoir 32. The force sustaining the piston 10 in the advanced position is removed which enables the piston 10 to move into a retracted position accompanied by a corresponding movement of the second piston 11 away from the shoulder 13 due to the presence of fluid in the control chamber 20 which acts as a strut between opposite ends of the pistons 10 and 11. Initial movement of the piston 10 enables the land 39 to enter the passage 35 before the head 38 engages with the seating 34 to isolate the master cylinder 2 from the brake 1, and further movement of the piston 10 in the same direction increases the effective volume of an expansion chamber 48 defined in the bore 12 between the piston 10 and the seating 34 to reduce the pressure applied to the brake 1, and thereby release the brake 1.

Movement of the piston 10 into the retracted position is accompanied by relative movement towards it of the piston 11, due to operation of the flow-control regulating valve 18. Specifically, due to the pressure drop across the spool 22 and the load in the spring 26, the spool moves into the position shown in the drawing to open the orifice 27 and permit fluid, at a controlled rate, to be returned to the reservoir 6 thereby reducing the effective volume of the control chamber 20 and, in consequence, the spacing between the pistons 10 and 11. Clearly the greater the period of time the brake 1 is released to correct the skid, the greater will be the relative distance through which the pistons 10 and 11 move towards each other.

At the termination of the skid signal the solenoid of the solenoid valve 28 is de-energised and the spring 47 is again operative to bias the member 29 away from the seating 30 and into re-engagement with the seating 31. Fluid under pressure from the accumulator 4 is again supplied to the chamber 21, and chamber 20 via the piston 11, and this pressure causes the piston 10 to move towards its advanced position, with the piston 11 moving through a relative distance. Since the pressure increase in chambers 21 and 20 due to pressure from the accumulator 4 is much the same, the pressure difference across piston 11 is generated by the force of spring 16 urging the piston 11 back to its abutment 13. When the piston 11 reaches the abutment 13, the force of spring 16 is reacted through the piston 11 onto the abutment 13, and thereafter the pressure in the chamber 21 can act over the valve spool 22, thereby causing the flow regulating valve 18 to meter any further fluid pressure increase between the chambers 21 and 20. Initial movement of the piston 10 towards its advanced position is therefore restricted by the effectively reduced trapped volume of fluid in chamber 20.

The movement of the piston 10 towards its advanced position reduces the effective volume of the expansion chamber 48, in turn to re-apply the brake 1 at a first, relatively rapid, rate which terminates at a changeover point at which the movement of the piston 11 is arrested by engagement with the shoulder 13. Thereafter additional movement of the piston 10 in the same direction depends upon the rate at which the effective volume of the control chamber 20 can be increased by a metered flow of fluid from the chamber 21 and into the chamber 20 through the flow-control regulator valve 18, as the piston 11 is biassed towards the shoulder 13 by the spring 16. Thus the brake 1 is re-applied following the changeover point, but at the second rate of pressure increase smaller than the first.

The changeover point will vary from one brake application to another, and depends upon the depth of skid and the relative distance through which the two pistons 10 and 11 have moved towards each other during the interval required to correct the skid.

Assuming no further skid signal is received during the braking cycle, the piston 10 will be returned, at a controlled rate, to its advanced position in which the volume of the expansion chamber 48 is at a minimum.

During the final stage of movement of the piston 10 into the advanced position, the piston 10 is operative to re-open the first valve 14 to re-establish communication between the master cylinder 2 and the brake 1. This is achieved in two stages, in the first of which the inclined face 40 is moved away from the seating 34 to permit a flow from the master cylinder 2 to the brake 1 to take place, but at a reduced rate determined by the annular clearance between the land 39 and wall of the passage 35, and in the second of which the land 39 clears the passage 35 to permit unrestricted communication between the master cylinder 2 and the brake 1, slightly before the piston 10 re-engages with the seating member 33 to define its advanced position.

Of course, should a second skid signal be received during a common braking cycle, then the sequence described above will be repeated with the direction of movement of the pistons 10 and 11 reversed to affect release of the brake 1.

Should the pump 5 and/or the accumulator 4 fail at any time, so that no support force can be generated in the support chamber 21, depending upon the position of the piston 10 in the bore portion 12 when such failure occurs, the piston 10 may not be able to hold the valve 14 open or to be movable in a direction to open the valve following correction of a skid. This difficulty is overcome by the provision of the piston 42 over the outer end of which the pressure from the pump 5 and/or accumulator 4 also previously acted as described above. Since pressure from the master cylinder 2 acts on the inner opposite end of the piston 42, the absence of such pressure acting on the outer end of the piston 42 enables the piston 42 to move relatively away from the seating 34 and into engagement with the closed end of the bore 8. The distance between the abutment 44 and the head 37 is chosen to provide an engagement therebetween which prevents the head 38 from engaging with the seating, and the land 39 from entering the passage 35. We therefore ensure that brake 1 can be applied by unrestricted flow from the master cylinder 2 to the brake 1, should the pump 5 and/or the accumulator 4 fail.

Figure 2:
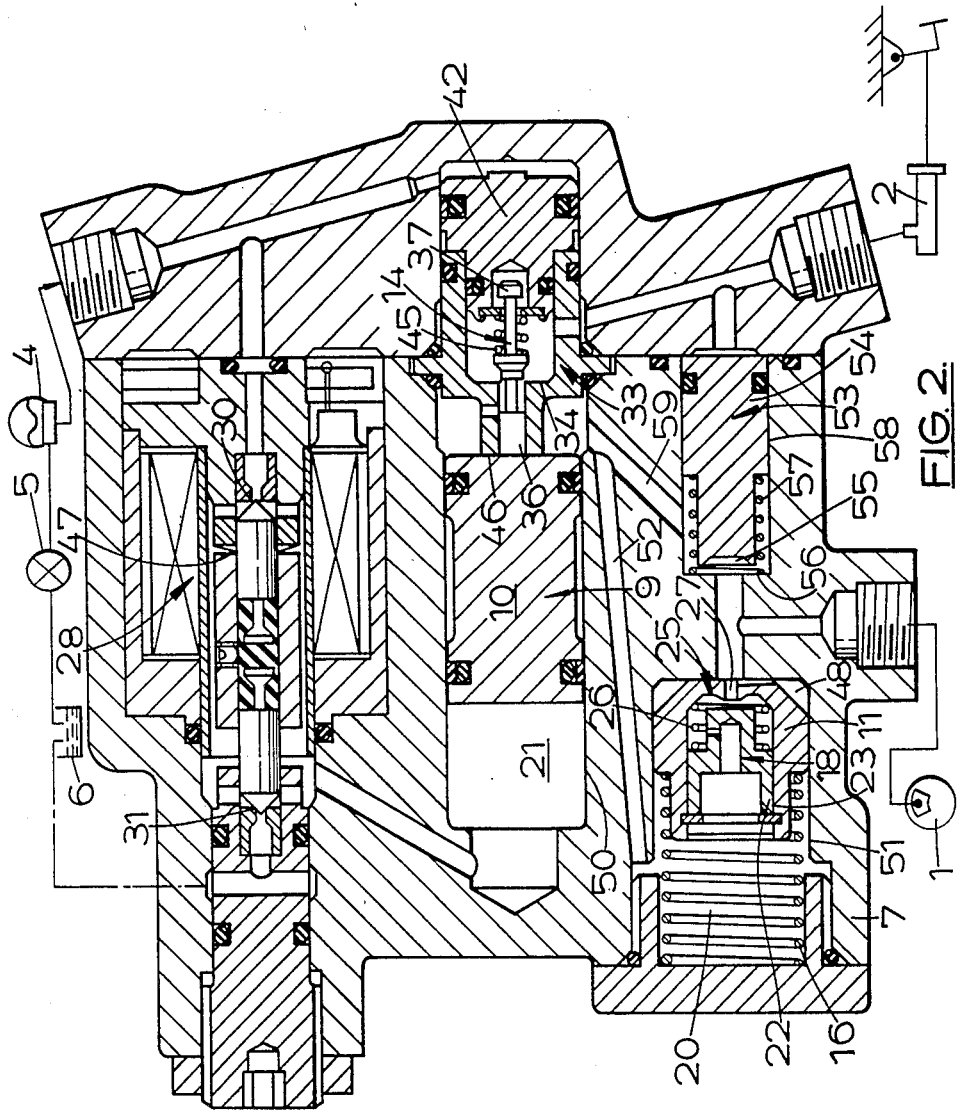
FIG. 2 is a layout of an hydraulic braking system similar to FIG. 1 but showing a modification.

The layout of FIG. 2 incorporates a modulator assembly 3 of modified construction. As illustrated the pistons 10 and 11 work in separate, parallel, bores 50 and 51 of which the inner end of the bore 50 and the outer end of the bore 51 are interconnected by a passage 52 to define the control chamber 20. The closed end of the bore 51 communicates with the brake 1 and defines the expansion chamber 48, and an isolator valve 53 is located between the master cylinder 2 and the brake 1. As illustrated the valve 53 comprises a piston 54 working in a bore 58 and exposed at one end to pressure from the master cylinder 2 and, at the opposite end, having a head 55 which is biased away from a seating 56 by means of a spring 57. The seating 56 is located between the seating 34 of the first valve 14, and the brake 1 and is disposed at the outer end of a passage 59 which communicates at its inner end with the passage 52.

In the inoperative position shown in the drawing, the piston 10 is held in its advanced position by the support force comprising the pressure fluid in the support chamber 21 and, in this position, the piston 10 acts to hold the first valve 1 open. Fluid can be supplied from the master cylinder 2 to the brake 1, with such fluid also being contained within the control chamber 20. Specifically the fluid flows through the open valve 14 and the open isolator valve 53.

When a skid signal is produced the valve 28 operates as described above to isolate the chamber 21 from the accumulator and to dump fluid from the chamber 21 to the reservoir 6. The piston 10 moves into its retracted position permitting the valve 14 to close, followed by closure of the isolator valve 53 due to a reduction in the pressure in the brake 1 which acts to hold it open. Further movement of the piston 10 in the same direction is accompanied by a related movement of the piston 11 away from the closed end of the bore 51, since the chamber 20 is connected to one end of the piston 10 by the passage 52. The effective volume of the expansion chamber 48 is thereby increased, relieving the pressure applied to the brake 1, and the piston 11 also tends to move a relatively smaller distance in its bore for a given movement of the piston 10, due to the metering effect of the flow-control regulator valve 18 and the pressure drop across the spool 22.

At the termination of the skid signal the piston 10 is urged towards its advanced position by the pressure restored to the chamber 21, and fluid trapped in the control chamber moves the piston 11 through a similar distance to displace fluid from the expansion chamber 48 to re-apply the brake. This continues at the first rate until the changeover point is reached at which the piston 11 engages with the face at the closed end of the bore 51. Thereafter, the pressure applied to the brake is increased by the metering effect of the flow control regulator valve 18 which continues until the piston 10 has moved through a sufficient distance to re-open the valve 14, whereafter the isolator valve 53 re-opens so that unrestricted communication is re-established between the master cylinder 2 and the brake 1.

The construction and operation of the braking system of FIG. 2 is otherwise the same as that of FIG. 1 and corresponding reference numerals have been applied to corresponding parts.

Figure 3:
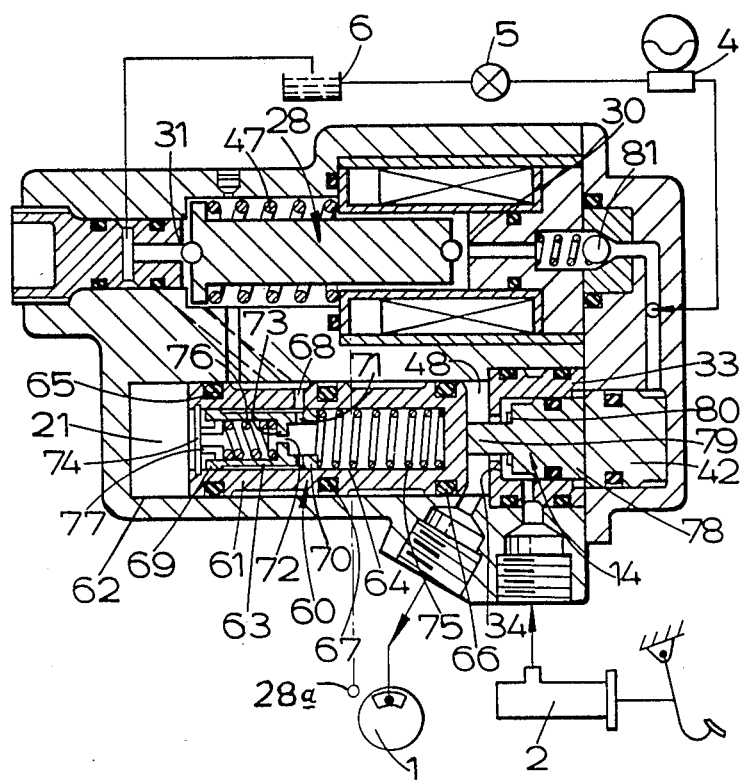
FIG. 3 is a layout of another hydraulic anti-skid braking system similar to FIG. 1.

In the layout of FIG. 3 the valve 14 is of modified construction, and the two pistons 10 and 11, and the flow-control regulator valve 18 are combined into a single piston assembly 60.

As illustrated in FIG. 3 the piston assembly 60 comprises a first hollow piston 61 of cup-shaped outline which works in a bore 62, and a second piston 63 in the form of a spool which works in the bore 64 in the piston 61.

The piston 61 is provided at opposite ends with a pair of axially spaced seals 65 and 66, and at an intermediate point in its length with a third seal 67. A port 68 communicating with the valve 28 is provided in the wall of the piston 61 between the seals 65 and 67 but adjacent to the seal 67.

The spool 63 includes axially spaced lands 69 and 70 at its opposite ends, and a diametral passage 71 adjacent to the innermost land 70. An orifice 72 is provided in a partition 73 which is disposed on the opposite side of the passage 71 from the land 70. The spool 63 is normally biassed against an abutment plate 74 at the end of the piston 61 remote from the valve 14 by a spring 75, and a second spring 76 acts between the partition 73 and a hollow abutment member 77 which is in separable engagement with the abutment plate 74.

The valve 14 comprises a piston 78 which works in the bore of the seating member 33 and has an extension 79 of reduced diameter which projects through the seating 34 for engagement with the closed inner end of the piston 61. In this position a head 80 in the form of a washer is spaced from the seating 34.

In the inoperative position shown in the drawing the piston 61 is held in its advanced position by fluid in the force sustaining chamber 21 which is supplied to it from the accumulator 4 through a one-way valve 81, the valve 28, the port 68, the passage 71, and the orifice 72.

The brake 1 is applied by fluid supplied from the master cylinder 2 through the open valve 14, and the piston 42 is biassed against an abutment at its outer end by the pressure of the accumulator 4 acting over the area of the piston 61, this area being greater than the area of the piston 42.

When a skid signal is produced the valve 28 closes to cut off communication between the accumulator 4 and the chamber 21, and place the chamber 21 in communication with the reservoir 6. By connecting the port 68 to the reservoir 6, the outer piston 61 moves relatively away from the seating member 33 to allow the valve 14 to close and subsequently increases the effective volume of the chamber 48 to relieve the brake pressure. During this movement the piston 63 moves in the opposite direction against the load in the spring 75 through a substantial distance to reduce the pressure in the chamber 21. The spring 75 is then operative to urge the spool 63 in the opposite direction to displace fluid from the chamber 21, which also defines the control chamber, for return to reservoir 6 through the passage 68, during the period for which the skid signal is operative and during which the spool 63 tends to return to its initial position.

At the termination of the skid signal, pressure is again applied to the piston assembly 60, and the pressure acts on the outer piston 61 to urge it towards its advanced position and relative to the spool 63 to reduce the effective volume of the expansion chamber 48 and re-apply the brakes during the first stage until the changeover point is reached at which the two pistons 61 and 63 have returned to their original relative positions. Thereafter further movement of the outer piston 61 towards the valve 14 takes place at a reduced rate determined by the effect of the land 70 metering fluid through the passage 68, since the spool 63 tends to compress the spring 76 due to the increasing pressure acting on the right-hand end of the spool 63.

The provision of the one-way valve 81 ensures that the de-boost piston 61 cannot be displaced by pressure in the chamber 48 should the accumulator 4 fail.

The construction and operation of the embodiment of FIG. 3 is otherwise the same as that of FIGS. 1 and 2 described above, and corresponding reference numerals have been applied to corresponding parts.

Figure 4:
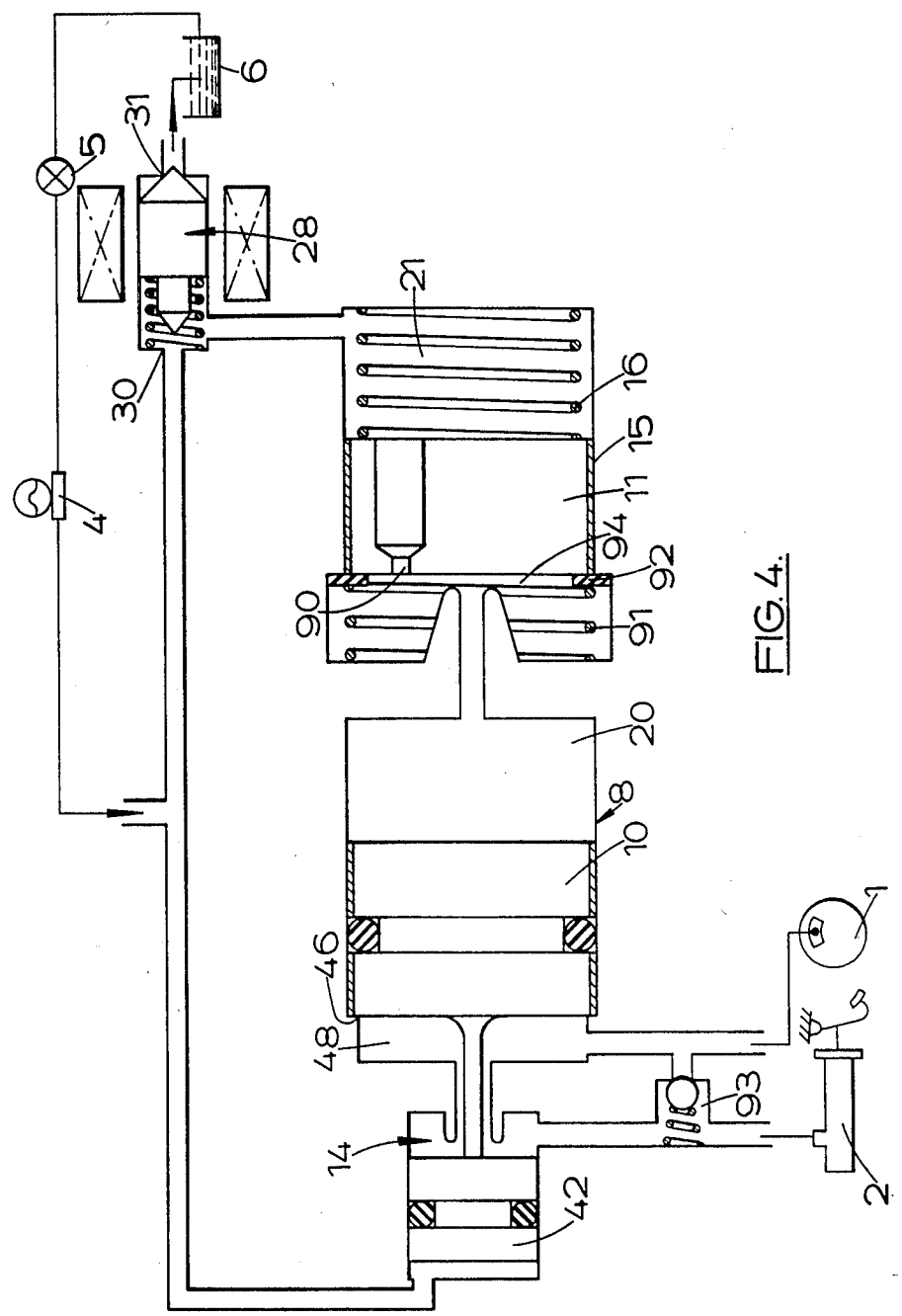
FIG. 4 is a layout of another hydraulic anti-skid braking system similar to FIG. 1.

In schematic layout of FIG. 4 the piston 11 is provided with an orifice 90 which controls communication between the sustaining chamber 21 and the control chamber 20, and a control orifice 94 is disposed between the two pistons 10 and 11. A spring 91 acts to urge an abutment plate 92 against a shoulder in the bore 8 to limit movement of the piston 11 towards the piston 10. The spring 91 is caged between the abutment plate 92 and an abutment at the adjacent end of the bore 15.

A one-way valve 93 is provided between the brake 1 and the master cylinder 2 on the downstream side of the first valve 14.

When the second valve 28 is operated in response to a skid signal, the chamber 21 is exhausted to the reservoir 6. The pistons 10 and 11 both move rapidly away from the valve 14 to permit the valve 14 to close and relieve the brake pressure by increasing the effective volume of the expansion chamber 48. When the signal is removed the valve 28 returns to its initial position and both pistons 10 and 11 move in the opposite direction causing the brake to be re-applied rapidly. During these rapid movements the spring 16 has caused the pressure acting on the right face of piston 11 adjacent to the valve 28 to be lower than that acting on the opposite face. This causes a flow in the orifice 90 and relatively small movement of the piston 11 towards the left and against the force in the spring 91 compared with its position corresponding to no leakage through the orifice 90. This means that the piston 11 will reach the abutment plate 92 on brake re-application, before the piston 10 reaches the abutment 46 which defines its advanced position. The flow to the support chamber 20 will now be restricted by the orifice 90, and the resulting pressure drop across the piston 11 causes it to compress the caged spring 91 and move to close the control orifice 94 and form a flow control valve of known type. This valve determines the slow re-apply rate.

The relative displacement of the piston 11 from its "no leakage" position controls the amounts of fast and slow rate re-apply which occur. This relative displacement depends on the sum of the dump and fast re-apply times.

The one-way valve 93 allows brake pressure to fall if the demand disappears during an anti-lock cycle.

The construction and operation of the system of FIG. 4 is otherwise the same as that of FIG. 1 and corresponding reference numerals have been applied to corresponding parts.

In a modification the pistons 10, and 11 could be replaced by, or be carried by, flexible diaphragms.

Figure 5:
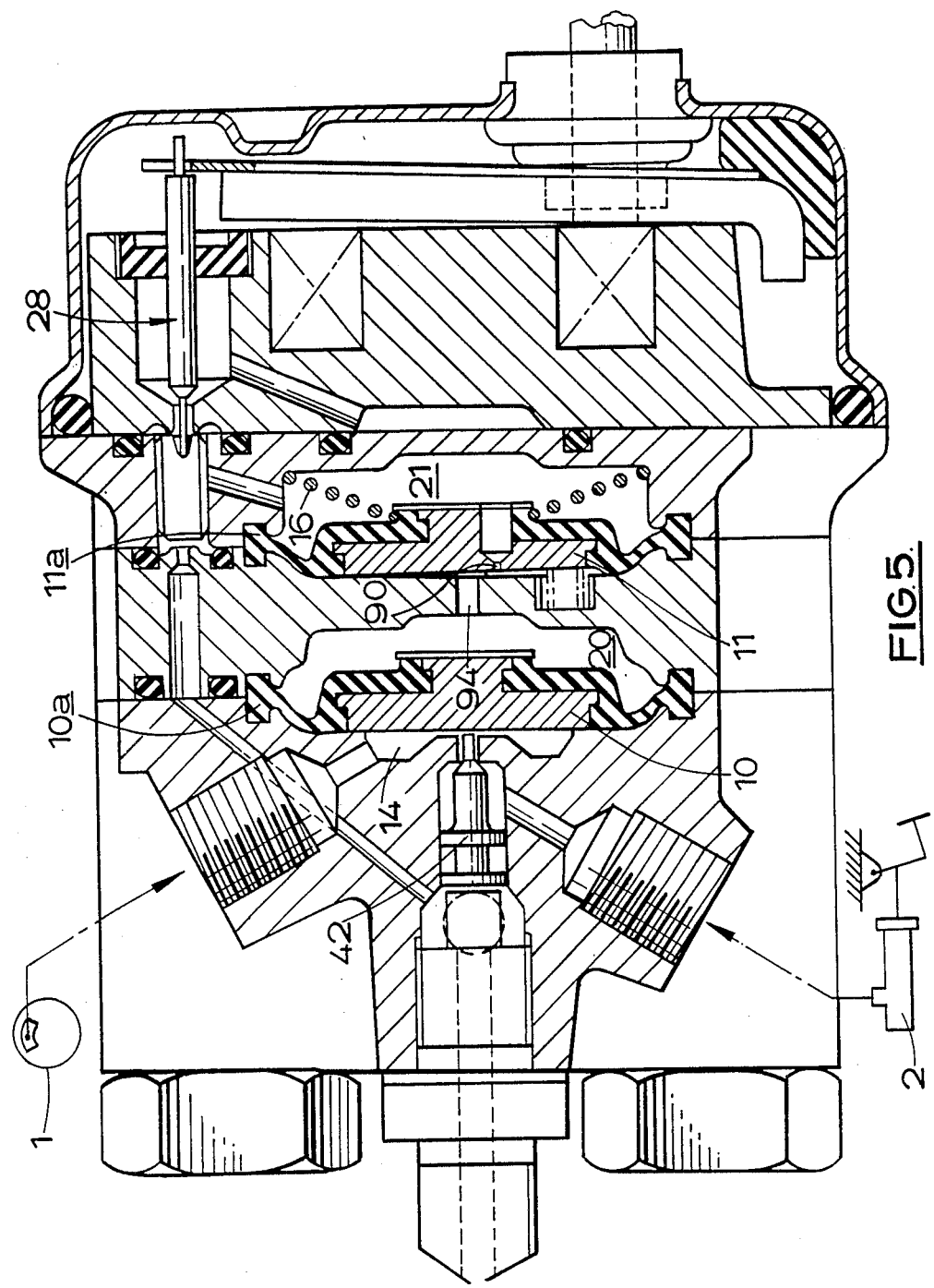
FIG. 5 is a layout of another hydraulic anti-skid braking system similar to FIG. 4.

FIG. 5 is a practical version of the modulator assembly embodied in the layout of FIG. 4 and corresponding reference numerals have been applied to corresponding parts.

In this embodiment the pistons 10 and 11 are carried by flexible diaphragms 10a and 11a.

Figure 6:
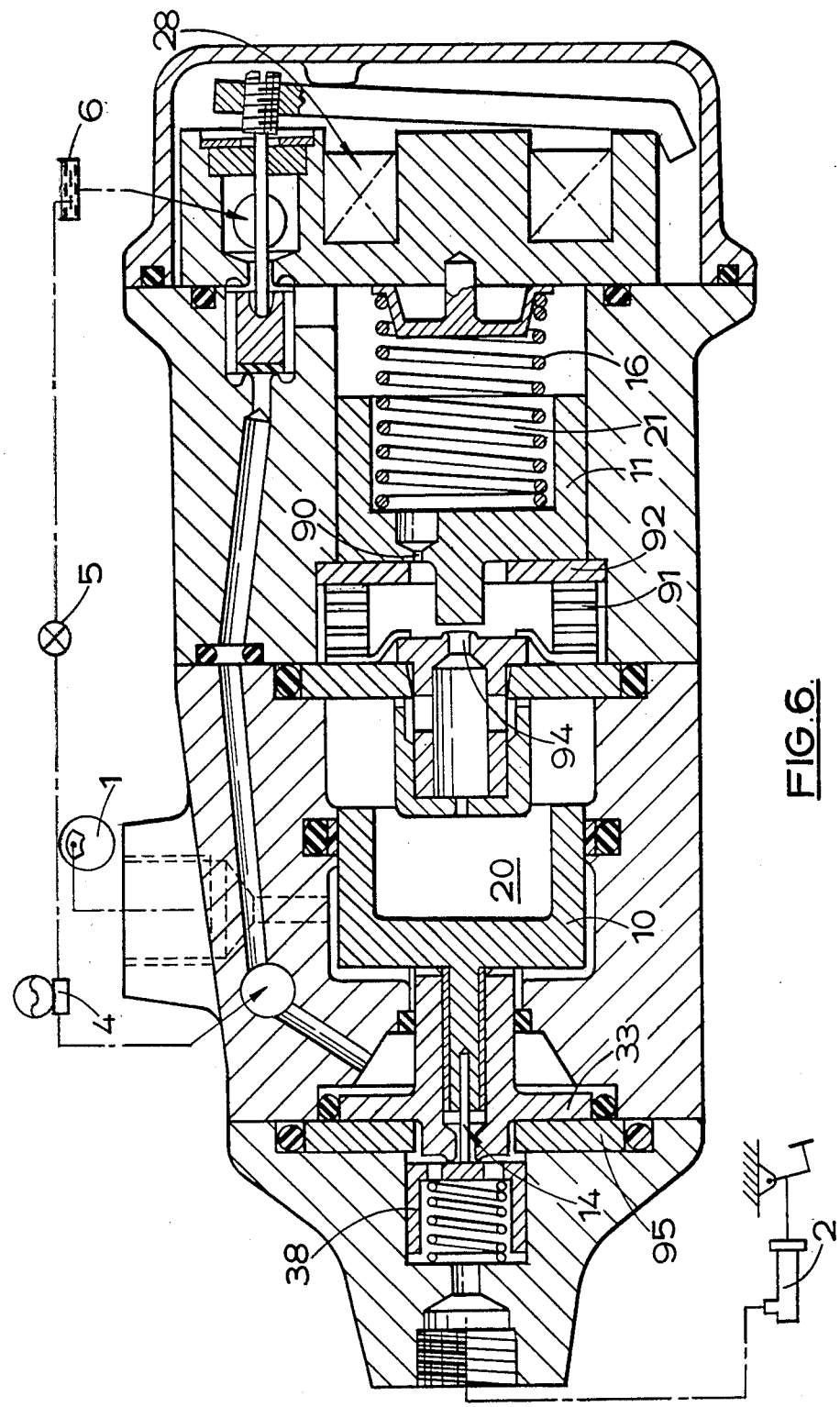
FIG. 6 is a layout of another hydraulic anti-skid braking system similar to FIG. 4.

FIG. 6 is another practical version of the modulator assembly embodied in the layout of FIG. 4 and, again, corresponding reference numerals have been applied to corresponding parts.

In the modulator assembly of FIG. 6 the valve seating member 33 is normally held against an abutment plate 95 when the accumulator is operative and the valve member 38 is spaced from the opposite face of the abutment plate 95. Upon failure of the accumulator 4 the piston 42 and the seating member 33 can move forward in response to pressure from the master cylinder 2 until movement of the valve member 38 is arranged by the plate 95. Futher relative movement of the seating member 33 in the same direction ensures that the valve 14 can never close, irrespective of the position of the piston 10 in its bore.

Figure 7:
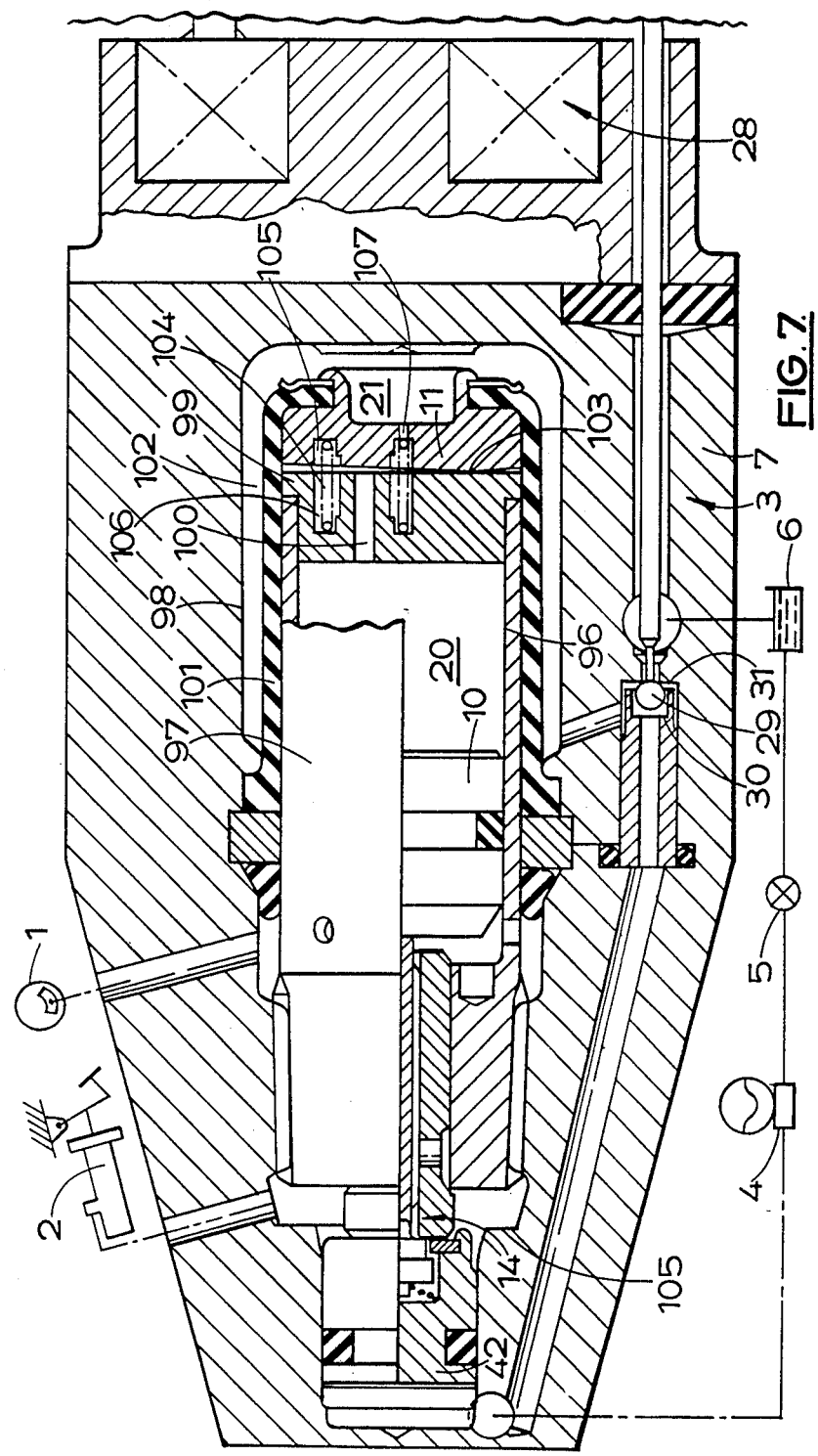
FIG. 7 is a layout of yet another hydraulic anti-skid braking system similar to FIG. 4.

Another layout of an anti-skid hydraulic braking system is shown in FIG. 7 of the accompanying drawings.

In the modulator assembly 3 of FIG. 7 the piston 10 works in the bore 96 of a hollow casing 97 which is in sealed, screw threaded, engagement at its inner end in a cavity 98 in the housing 7. The piston 10 acts at its inner end to operate the valve 14, and at its outer end the casing 97 is closed by a rigid end closure 99 provided with an orifice 100.

The piston 11 is carried by a cylindrical sac 101 of elastomeric material, and the sac 101 is housed in an annular space 102 defined between the casing 97 and the cavity 98 with a substantial clearance provided between the sac 101 and the wall of the cavity 98. The inner face of the piston 11 has a rocking engagement with the adjacent face of the closure 100 about a fulcrum 103 at an intermediate point in its diametral width. A compression spring 104 received in superimposed recesses 105, 106 in the piston 11 and the closure 99 normally acts to tilt the closure about the fulcrum 103 into a position in which an unrestricted flow is permitted through an orifice 107 in the piston 11.

The hydraulic fluid from the accumulator 4 fills the space 102, which defines the force sustaining chamber, and the sac 101 is held against the wall of the casing 97.

The piston 10 is held in its advanced position in which the valve 14 is open so that the master cylinder 2 and the brake 1 are in open communication. In the position shown in the drawings, the piston 10 is on the point of opening the valve 14; in the inoperative retracted position the piston 10 abuts the closure 99.

When a skid signal is produced and the valve 28 closes to exhaust the space 102 to the reservoir 6, the sac 101 expands to accommodate fluid displaced by movement of the piston 10 into its retracted position to permit the valve 14 to close, and relieve the pressure applied to the brake 1. Also fluid from the control chamber 20 tends to meter through the orifice 107 and back to the reservoir 6 through the space 102.

At the termination of the skid, the space 102 is again subjected to pressure in the accumulator 4 and the sac 101 is displaced inwards by that pressure to urge the piston 10 towards its advanced position to re-apply the brake. The first stage of re-apply continues until the changeover point is reached at which the piston 11 rocks about the fulcrum 103 with the closure 99 whereafter the subsequent movement of the piston 10 into the advanced position is determined by flow through the orifice 107 and the pressure differential acting across the piston 11 which varies the effective throttle formed between the piston 11 and the end wall 99.

The valve member 29 performs the same function as that of the valve member 29 in the construction illustrated in FIG. 1 of the drawings and also performs the function of one-way valve 81 in the construction illustrated in FIG. 3. This is achieved by arranging for the ball 29 to be located in the seat member 30 with a restricted clearance.

The construction and operation of the layout of FIG. 7 is otherwise the same as that of FIGS. 1 and 4 described above and corresponding reference numerals have been applied to corresponding parts.

We claim:

1. An anti-skid hydraulic braking system for vehicles comprising a wheel, a brake for braking said wheel, skid sensing means responsive to the behaviour of said wheel and adapted to emit skid signals, a source of hydraulic fluid for applying said brake, a modulator assembly for modulating the supply of fluid from said source to said brake in response to said signals from said skid sensing means, said modulator assembly comprising a housing having a bore, a de-boost piston assembly located in said bore in said housing and movable between an advanced position and a retracted position, means in said housing defining an expander chamber connected to said brake, a first valve disposed between said source and said expander chamber, means for providing a fluid-sustained support force, and a second valve for controlling the application to said de-boost piston assembly of said fluid-sustained support force to determine the relative position of said de-boost piston assembly in said bore, said second valve normally being so operative that said support force holds said de-boost piston assembly in said advanced position in which the effective volume of said expander chamber is at a minimum value, said first valve normally being open to provide communication between said source and said brake at least when the deboost piston assembly is in the said advanced position, and means responsive to a skid signal to manipulate said second valve in order to reduce said support force whereafter said de-boost piston assembly can move away from said advanced position and into said retracted position in which the effective volume of the expander chamber is increased thereby reducing the pressure applied to said brake, the reduction in said support force also permitting said first valve to close, wherein said first valve comprises a seating member, and a valve member movable with respect to said seating member in response to movement of said de-boost piston assembly in said bore between said advanced and retracted positions, and safety means responsive to said pressure which provides said fluid-sustained support force is adapted to co-operate with one of said members to permit said seating member and said valve member to engage each other to permit said first valve to close unless the said pressure is inoperative, wherein said safety means comprises a first piston working in a bore in said housing and co-operating with said valve member, said first piston and said valve member being both moveable together in first and second opposite directions towards and away from said seating member when an assembly defined by said first piston and said valve member is subjected to a net force acting in one of said first and second directions.

2. A system as claimed in claim 1, wherein said valve member comprises a second piston working in said bore, and said assembly defined by said first piston and said second piston is of differential outline having a first face exposed to said pressure which provides said fluid-sustained support force, and a second face of which the effective area is smaller than that of said first face and which is subjected to pressure from said source, said pressure applied to said second face urging said assembly in said second direction upon failure of said pressure normally acting on said first face.

3. A system as claimed in claim 2, wherein said effective areas of said first and second faces are so chosen that upon failure of said pressure normally acting on said first face a net force of the said pressure from said source is sufficient to move said first and second pistons in said second direction without the provision of a return spring.

4. A system as claimed in claim 3, wherein said first piston has an inner end, and said second piston has an outer end, and said inner end has a direct engagement with said outer end.

* * * * *